United States Patent [19]

Heredia Batista et al.

[11] Patent Number: 5,713,386
[45] Date of Patent: Feb. 3, 1998

[54] VALVE

[75] Inventors: Antonio Heredia Batista; Fermin Jaime Loureiro Benimeli, both of Barcelona, Spain

[73] Assignee: Fast Air, S.L., Madrid, Spain

[21] Appl. No.: 406,965

[22] PCT Filed: Jul. 29, 1994

[86] PCT No.: PCT/ES94/00077

§ 371 Date: Jun. 1, 1995

§ 102(e) Date: Jun. 1, 1995

[87] PCT Pub. No.: WO95/04235

PCT Pub. Date: Feb. 9, 1995

[30] Foreign Application Priority Data

Jul. 29, 1993 [ES] Spain ............... 9301710
Oct. 6, 1993 [ES] Spain ............... 9302096

[51] Int. Cl.⁶ .................................... F16K 15/20
[52] U.S. Cl. ............... 137/233; 137/227; 73/146.8; 152/415
[58] Field of Search ............... 137/233, 227; 73/146.3, 146.8; 152/415, 427, 429, 431

[56] References Cited

U.S. PATENT DOCUMENTS

| | | | |
|---|---|---|---|
| 1,304,116 | 5/1919 | Stephens | 137/233 |
| 1,678,837 | 7/1928 | Whipple | 137/233 |
| 1,812,610 | 6/1931 | Royer | 137/233 |
| 1,865,231 | 5/1932 | Buck | 137/223 |
| 1,928,069 | 9/1933 | Moore | 137/233 |
| 1,989,994 | 2/1935 | Lear | 137/233 |
| 2,178,828 | 11/1939 | Broecker | 137/233 |
| 2,233,173 | 2/1941 | McCoy | 152/429 |
| 2,749,931 | 6/1956 | Battin | 137/233 |
| 3,176,706 | 4/1965 | Scramlin | 73/146.3 X |
| 3,280,879 | 10/1966 | Simms | 152/427 |
| 3,637,002 | 1/1972 | Hughes | 152/429 |
| 4,072,048 | 2/1978 | Arvan | 73/146.8 |

FOREIGN PATENT DOCUMENTS

| | | |
|---|---|---|
| 702493 | 1/1931 | France . |
| 1218398 | 5/1960 | France . |
| 1044423 | 9/1966 | United Kingdom . |
| 9114120 | 9/1991 | WIPO . |

*Primary Examiner*—John Rivell
*Attorney, Agent, or Firm*—Merchant Gould Smith Edell Welter & Schmidt

[57] ABSTRACT

Improved valve presents a threaded end, suitable for permitting the positioning of a valve core which is in charge of performing the opening or closing of the passage of air. Over the end threaded portion, a device is mounted with assembly for closing the mouth of the valve and for actuating the valve core, the device including a main body, or a main body and an external body coupleable with each other, a rod and a spring. The device presents a mouth of preferably truncoconical shape and various peripheral external ribs. The rod presents a cylindrical shape having at the rear end an axial orifice, and at the front end a head preferably of truncoconical shape, the valve permitting the charging and discharging operation of air in a tire, capable of performing an air-tight closure caused by the action of a toric joint mounted on the pushing rod of the valve.

13 Claims, 3 Drawing Sheets

VALVE the present invention relates, as indicated in the title, to an improved valve of the type which incorporate a substantially cylindrical shape suitable for being fixed on a tire, presenting a threaded and having a valve core intended to carry out the opening and closing of the passage of the air.

BACKGROUND OF THE INVENTION

Generally, the valves of tires have an extractible cap which is externally fixed at the end of the same with the purpose of impeding the entrance of dirt in the zone where the valve core is placed, said cap presenting the drawback that each time it is desired to test the pressure of the tires, it is necessary to take off the cap, thus getting hands dirty in addition to the risk of loss of the cap due to the complete separation of the same from the valve when extracted.

In many vehicles these valves are place din cavities situated in hubcaps of tires which results in making difficult the removal of the cap of the tires or even more difficult connecting the air pressure supply mouthpiece on to them, such that in some vehicles it is indispensable to take off the hubcaps in order to be able to have access to the corresponding valve.

SUMMARY OF THE INVENTION

In order to overcome these problems, the improved valve, object of the invention, is herewith proposed, which has at an end thereof, a device with means for closing the passage of the air and for actuating of the valve core.

This valve has the advantageous feature that once an end device is placed on the valve it will not be necessary to take off the same for testing the pressure of the tire, eliminating in this manner, manual manipulation of elements as occurs in the case of valves with extractible cap.

The end device of the value is composed of a main body which is fixed on a threaded portion at an end of the valve presenting internally a stair-shaped cylindrical configuration wherein a rod is located which actuates with its head on an opening of the main body, due to the pushing effect of a spring mounted on the intermediate zone of the rod as well as on an interior platform of the main body respectively, in such a manner that the rod tends to maintain closed the mouth of the valve, and when it is axially displaced towards the rear zone of the valve, overcoming the pressure of the spring, pushes the rod of the valve core thus allowing the passage of air through the inside of the valve.

The improved valve, object of the invention, thus permits the end portion of the same to be always maintained in closed position, except when the mouthpiece of an air pressure supply is coupled thereto, which pressure forces the rod to be axially displaced towards the rear zone, the latter pushing a rod of the valve core thus performing the opening of the valve.

The device which is fixed at an end of the valve may be constituted by two independent bodies which can be coupled between each other, having inside and in an intermediate zone, the rod for the passage of air and the spring which maintains the latter in a normally closed position, said device being fixed on to the valve by means of an interior threaded zone of the latter which receives a rear zone of the device also threaded although externally in conformity with the mentioned threaded zone of the valve.

Advantageously the device which is fixed at an end of the valve may be constituted by a single body which is has inside a rod for the passage of air and the corresponding spring in order to maintain the rod in a normally closed position, said device being fixed on to the main valve by means of an exterior threaded zone of the latter which receives a rear zone of the device also threaded although internally in conformity with the mentioned threaded zone of the valve.

The latter constitution permits also for obtained an air-tight closure between the rod for the passage of air and the mouth of the device thus impeding the leakage of air due to a special structure of the head of the rod which carries and elastic toric joint that in a closed situation, i.e. in the absence of air pressure supply, blocks the mouth of the device due to the pushing effect of the spring over the head of the rod and therefore over said mouth of the end device, Said end device has a single main body which externally presents a polygonal edge for providing grip for a socket wrench and a number of peripheral ribs for the grip of the air pressure supply mouthpiece, and a pushing rod inside said main body of the device for pushing the rod of the valve core, said pushing rod having at the front zone a toric joint of adequate dimensions in order to act with its periphery on a trunco-conical portion presented inside the main body performing an air-tight closure; in case of leakage of air through the valve core, said toric joint yield sufficiently as to permit the head of the rod to project out through the mouth of the device, thus indicating a defective closure of the valve core; additionally inside said main body a rod guiding plate is located, preferably of rubber material which acts as a coupling joint between the device and the valve, and a spring which tends to displace the rod towards the mouth of the device, the toric joint mounted on the head of the rod acting against the trunco-conical portion defined inside the device, thus performing an air-tight closure.

The rod of the end device of the object of this invention, defines at the rear zone thereof an axial orifice suitable for receiving inside the same the end of the valve core, such that the pushing rod of the end device by receiving pressure from the air supply mouthpiece, the rod is displaced towards the rear zone giving rise to the opening of the device, and displacing in turn the valve core in order to perform the opening of the same, thus permitting the entrance and exit of air through the end device and the valve.

BRIEF DESCRIPTION OF DRAWINGS

In order to better understand the object of the present invention two practical embodiments of the same are herewith represented through the accompanying drawings, in said drawings.

DETAILED DESCRIPTION OF THE PREFERRED EMBODIMENT

Figure 1:
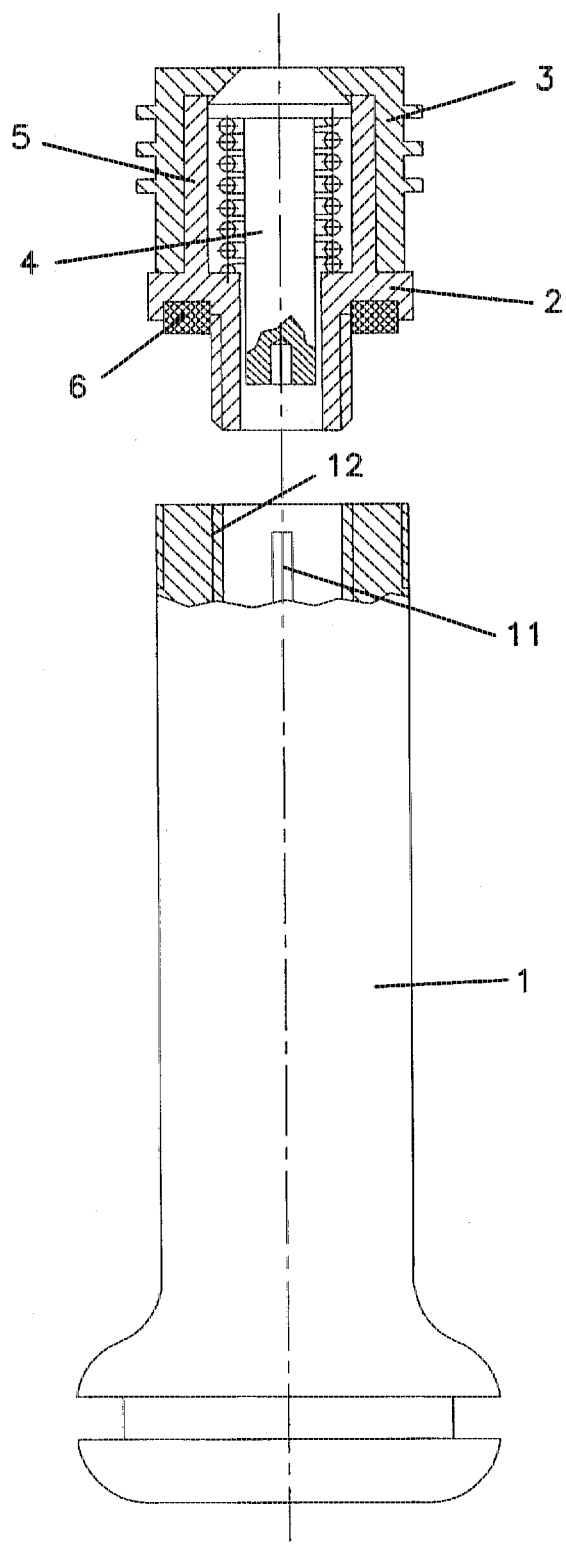
FIG. 1 shows an elevation view, and partially sectioned of the whole assembly of the valve with an end device taken off.
Figure 2:
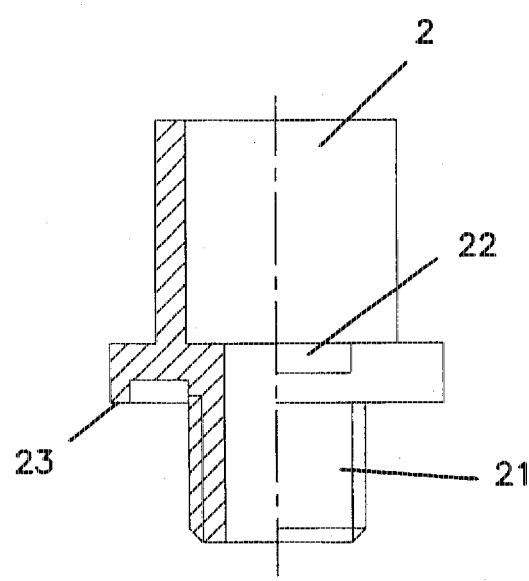
FIG. 2 shows an elevation view and partially sectioned of the main body of the end device of FIG. 1.
Figure 3:
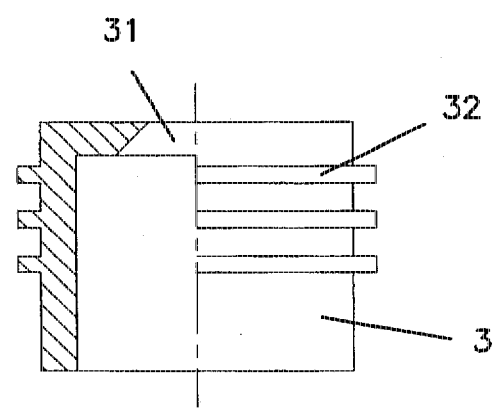
FIG. 3 shows an elevation view and partially sectioned of the exterior body of the end device of FIG. 1.
Figure 4:
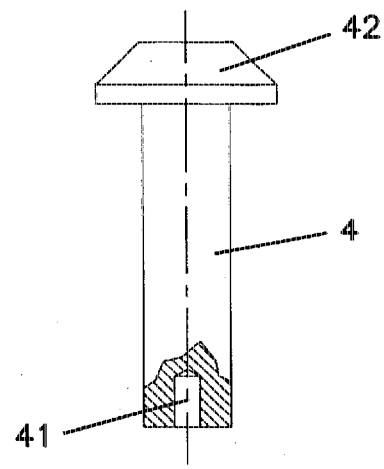
FIG. 4 shows an elevation view of the rod of the end device partially sectioned.

As it may be observed in FIGS. 1 to 4 the valve of the invention presents a body (1) of a substantially cylindrical shape suitable for being fixed on a tire inside of which a valve core is placed which tends to carry out the closing of the interior orifice of said body (1) the valve core presenting a rod (11) which by being axially displaced towards the rear zone of the body (1) performs the opening of the internal passage of the body (1) thus permitting the entrance and the exit of air through the body (1).

The end of body (1) presents an internal threaded zone (12) which allows for the mounting of the valve core and that of an end device composed of a main body (2) with which a body (3) is coupled and inside of which a rod (4) and a spring (5) are located.

the main body (2) of the end device presents at its rear zone a threaded portion (21) which permits that the same is mounted over the threaded zone (12) of body (1) and externally two undercuttings (22) in diametrically opposed position for permitting the positioning or taking off the body (2) by means of a plane wrench.

The body (2) defines internally a cylindrical stair-shaped cavity and externally an undercutting (23) suitable for receiving a coupling joint (6) which assures that the union of the two bodies (1) and (2) is sealed.

The exterior body (2) of the end device joined to the body (2) defines a mouth (31) of a preferably trunco-conical shape, and externally a number of peripheral ribs (22) being the means for the grip of an air pressure supply mouthpiece.

Rod (4) located inside body (2) presents a cylindrical configuration which defines at a rear zone thereof and axial orifice (41) of adequate dimensions so as to receive inside the rod (11) of the valve core, said rod (4) having at the front zone thereof a head (42) of a trunco-conical shape, suitable for performing the closure of mouth (31) of body (3), said rod (4) tending to be maintained in the closing position due to the pressure received by a spring (8) mounted on the same rod (4) which acts through its ends on the head (42) and on to the interior stair-shaped portion of body (2).

Figure 5:
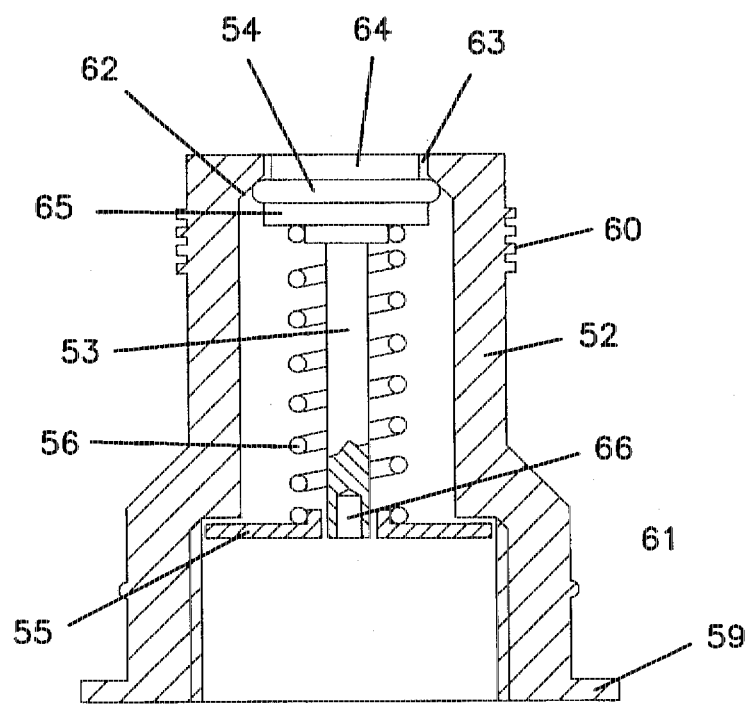
FIG. 5 shows an elevation view of the valve and the end device according to a second embodiment being aligned and the end device being sectioned by means of vertical plane.
Figure 5:
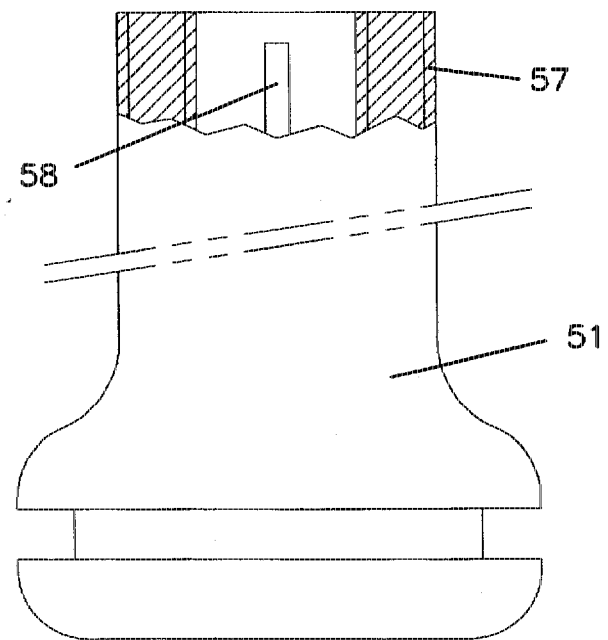

According to a second embodiment of the invention, shown in FIG. 5, valve (51) defines a conventional configuration suitable for being fixed on to the tire and presenting close to the mouth, on an external zone, a threaded portion (57) over which normally a conventional cap is placed; and inside the mouth of the valve (51) the rod of a valve core (58) can be observed which is in charge of performing the closure of the valve (51) when over said rod of valve core (58) no pressure is active.

This valve incorporates an end device which defines a single main body (52) on the periphery of which there is a polygonal edge (59) which permits body (52) to be gripped by means of a socket wrench and externally close to the mouth of the same various peripheral ribs (60) can be observed which permit the grip of an air supply mouthpiece not shown in the figure.

The main body (52) of the end device presents at the interior and rear portion thereof a threaded portion (61) and close to its mouth a trunco-conical portion (62) which ends at a cylindrical mouth (63) of slight height.

The interior threaded portion (61) of body (52) permits the device to be fixed on the external threaded portion (57) of valve (51).

Inside the end device a pushing rod (53) is placed which has at its front end two cylindrical portions (64) and (65) with larger diameters than that of the rod, the upper cylindrical portion being of smaller diameter than that of the lower cylindrical portion, and between which a toric joint (54) is mounted with dimensions suitable for acting against the trunco-conical surface (62) of the main body (52) when the rod (53) tends to be displaced towards mouth (63) of body (52); the pushing rod (53) defines at its rear zone an axial orifice (66) suitable for receiving inside the rod (58) of the valve core.

In the case where rod (58) of the valve core does not perform an appropriate closure, portion (65) of the rod would receive, apart from the pressure of the spring (56), an additional pressure caused by the pressure of the air which passes through the valve core, thus pressing the toric joint (54) over the trunco-conical surface (62), thus making the cylindrical portion (64) to project out through mouth (63) of the device which indicates a defective closure of the valve core.

Inside the main body (52) of the end device there are a guiding plate (55) of rod (53) which is interlocked by pressure over the internal threaded portion (61) of body (52) and a spring (56) preferably helicoidal which acts with its ends over the guiding plate (55) and the portion (65) of rod (53) tending to displace the rod (53) towards mouth (63) of body (52), and consequently performing an air-tight closure caused by the action of the toric joint (56) against the trunco-conical surface (62) of the main body (52) of the end device.

With this arrangement, having mounted the body (52) over valve (51) a closure is obtained which is performed by the valve core (58) and a second air-tight closure caused by the action of the toric joint (54) against the trunco-conical surface of the end device; when an air supply mouthpiece is fixed over the end device, the rod (53) is pushed by the former towards the rear zone, thus separating the toric joint (54) from the trunco-conical surface (62) and rod (53) in turn displaces the rod (58) of the valve core towards the rear zone performing the opening of the same, therefore permitting the entrance and exit of air through the valve and the end device mounted therefor.

Having sufficiently described the nature of the present invention as well as one way for putting it into practice, it only remains to be added that it is possible to introduce changes of form material and disposition as long as said alterations do not vary substantially the characteristics of the invention which are claimed as follows:

We claim:

1. A valve assembly of a type suitable for use with tires, the valve assembly comprising:

a valve having a substantially cylindrical shape with an internally threaded end portion for receiving an end device; and said end device having an axially displaceable inside rod for acting on a valve stem, said rod cooperating with a coil spring adapted to act on a head portion of said rod;

said end device comprising:

a main body of a generally cylindrical shape having an externally threaded rear portion adapted to be threaded to the internally threaded end portion of the valve;

a rear recessed zone for receiving a coupling joint surrounding a base portion of said externally threaded rear portion at a position of closure of the end device over the valve, the rear recessed zone having an inside surface defining a space with a stair-shaped cylindrical configuration for receiving the rod and the coil spring within said space where said coil spring is adapted to rest, at a lower end thereof, on said stair-shaped configuration; and an external body, of a generally cylindrical shape with a diameter adapted to provide coupling between said external body and the main body for forming a housing for the coil spring and the rod, said external body having a mouth with a trunco-conical inner surface.

2. A valve assembly according to claim 1, wherein the main body of the end device includes at least two external planes diametrically opposed adapted to provide a grip for a tool.

3. A valve assembly according to claim 1, wherein the external body of the end device has a plurality of external peripheral ribs adapted to provide a grip for an air pressure supply mouthpiece.

4. A valve assembly according to claim 1, wherein the valve includes a valve core with a second rod disposed therein, the rod of the end device defines a cylindrical shape which includes at a rear end an axial orifice suitable for receiving the second rod of the valve core of the valve and at a front end a head with a trunco-conical shape having a larger diameter.

5. A valve assembly, of a type suitable for use with tires, the valve assembly comprising:

a valve having a substantially cylindrical shape with an externally threaded end portion for receiving an end device with an internally threaded portion at a rear zone thereof;

said end device having an axially displaceable inside rod for acting on a valve stem, said rod cooperating with a coil spring adapted to act on a head portion of said rod;

said end device comprising:

a mouth having a lower portion of a trunco-conical shape and an upper portion of cylindrical shape, the upper portion having a diameter in conformity with a diameter of an upper cylindrical portion of the rod and a height adapted to normally remain level with respect to an upper surface of said upper cylindrical portion;

said rod comprising a generally cylindrical main body having the head portion composed of the upper cylindrical portion of the rod and a lower cylindrical portion of the rod where the diameter of the upper cylindrical portion is smaller than that of the lower cylindrical portion, the diameters of the upper and lower cylindrical portions being substantially larger than that of the main body of the rod;

a toric joint being placed on the lower cylindrical portion of the head portion of the rod, enclosing the upper cylindrical portion of said head portion of the rod, the toric joint being of elastic material; and a guiding plate located inside the end device being adapted to guide an axial displacement of the rod and to act as a coupling joint between the end device and the valve.

6. A valve assembly according to claim 5, wherein an upper surface of the rod of the end device is disposed inside the main body in a normal condition, the upper surface of the rod of the end device is forced to project outside from the main body in a second condition whereby leakage of air is produced due to an improper closure of the second rod of the valve core.

7. A valve assembly according to claim 5, wherein the end device includes an external polygonal edge for a grip of a socket wrench and a plurality of peripheral ribs for a grip of an air supply mouthpiece.

8. A valve assembly according to claim 5, wherein the toric joint has dimensions configured to act upon the trunco-conical shape of the lower portion of the mouth of the end device.

9. A valve assembly according to claim 5, wherein the guiding plate of the rod is disposed by pressure in the internally threaded portion at the rear zone of the end device.

10. A valve assembly according to claim 5, wherein the guiding plate is made of rubber material.

11. A valve assembly according to claim 10, wherein the toric joint has an elasticity adapted to yield under a pressure higher than that exerted by the spring.

12. A valve assembly according to claim 5, wherein the spring is mounted between the guiding plate and the head portion of the rod.

13. A valve assembly according to claim 5, wherein the valve has a valve core, the rod includes at a rear end an axial orifice suitable for receiving therein an end of the valve core when the rod is displaced rearwardly caused by a pushing effect of an air supply mouthpiece.

* * * * *